United States Patent
Hu

(10) Patent No.: US 8,678,201 B2
(45) Date of Patent: Mar. 25, 2014

(54) AIRCRAFT POTABLE WATER SYSTEM

(75) Inventor: Jin Hu, Hudson, OH (US)

(73) Assignee: Goodrich Corporation, Charlotte, NC (US)

( * ) Notice: Subject to any disclaimer, the term of this patent is extended or adjusted under 35 U.S.C. 154(b) by 327 days.

(21) Appl. No.: 13/031,631

(22) Filed: Feb. 22, 2011

(65) Prior Publication Data

US 2011/0297609 A1 Dec. 8, 2011

Related U.S. Application Data

(60) Provisional application No. 61/351,597, filed on Jun. 4, 2010.

(51) Int. Cl.
| | | |
|---|---|---|
| *B01D 29/00* | (2006.01) | |
| *B01D 39/00* | (2006.01) | |
| *B01D 29/07* | (2006.01) | |
| *B01D 39/14* | (2006.01) | |

(52) U.S. Cl.
USPC ........ 210/490; 210/509; 210/508; 210/493.1; 210/500.25; 210/500.26

(58) Field of Classification Search
USPC ................. 210/505, 502.1, 484, 489, 500.38, 210/493.1, 493.2, 506–508, 321.77, 650; 55/527
See application file for complete search history.

(56) References Cited

U.S. PATENT DOCUMENTS

| | | | |
|---|---|---|---|
| 4,483,771 A | 11/1984 | Koch | |
| 4,995,976 A | 2/1991 | Vermes et al. | |
| 5,006,267 A | 4/1991 | Vaughn et al. | |
| 5,102,547 A * | 4/1992 | Waite et al. | 210/501 |
| 5,128,041 A * | 7/1992 | Degen et al. | 210/638 |
| 5,215,662 A * | 6/1993 | Johnson et al. | 210/500.38 |
| 5,269,919 A | 12/1993 | Von Medlin | |
| 5,290,443 A * | 3/1994 | Norton | 210/321.87 |
| 5,403,482 A * | 4/1995 | Steere et al. | 210/489 |
| 5,407,573 A | 4/1995 | Hughes | |
| 5,415,770 A | 5/1995 | Heskett | |
| 5,580,447 A | 12/1996 | Platter et al. | |
| 5,762,759 A * | 6/1998 | Wedel | 162/193 |
| 5,762,797 A * | 6/1998 | Patrick et al. | 210/497.1 |
| 5,895,573 A * | 4/1999 | Scharstuhl | 210/321.87 |
| 5,925,243 A | 7/1999 | Clark et al. | |
| 5,985,573 A * | 11/1999 | Hennink et al. | 435/6.12 |
| 6,017,454 A * | 1/2000 | Horl et al. | 210/321.68 |
| 6,171,496 B1 * | 1/2001 | Patil | 210/484 |
| 6,293,411 B1 * | 9/2001 | Beer | 210/490 |
| 6,454,952 B1 | 9/2002 | Thorpe | |
| 6,838,005 B2 * | 1/2005 | Tepper et al. | 210/660 |
| 6,838,605 B2 * | 1/2005 | Belli | 84/411 R |
| 6,854,601 B2 | 2/2005 | Patil | |
| 7,311,752 B2 | 12/2007 | Tepper et al. | |

(Continued)

FOREIGN PATENT DOCUMENTS

| | | |
|---|---|---|
| WO | WO2004020285 A1 | 3/2004 |
| WO | 2009106084 A1 | 9/2009 |
| WO | WO2009106084 | 9/2009 |

*Primary Examiner* — Ana Fortuna
(74) *Attorney, Agent, or Firm* — Cantor Colburn LLP

(57) ABSTRACT

A potable water system (10) comprises a supply line (18) and a water-purification device (20) incorporated thereinto. The water-purification device (20) comprises a microorganism filter (40) having a housing (42) and replaceable cartridge (42). The cartridge's filter media (50) includes a microorganism-capturing membrane (e.g., comprising an electropositive material) and a microorganism-killing membrane (e.g., comprising a biocidal material).

20 Claims, 5 Drawing Sheets

(56) References Cited

U.S. PATENT DOCUMENTS

| | | | |
|---|---|---|---|
| 7,381,331 B2 | 6/2008 | Duong et al. | |
| 7,381,333 B1 * | 6/2008 | Rainer | 210/660 |
| 7,390,343 B2 * | 6/2008 | Tepper et al. | 55/527 |
| 2003/0222010 A1 * | 12/2003 | Bassett et al. | 210/312 |
| 2005/0000911 A1 | 1/2005 | Thorpe | |
| 2007/0131872 A1 | 6/2007 | Shearer et al. | |
| 2007/0175196 A1 * | 8/2007 | Tepper et al. | 55/527 |
| 2008/0245736 A1 * | 10/2008 | Charkoudian et al. | 210/650 |
| 2008/0251442 A1 * | 10/2008 | Shen et al. | 210/315 |
| 2009/0205116 A1 | 8/2009 | Stone et al. | |
| 2010/0133155 A1 | 6/2010 | Nolan | |
| 2011/0024355 A1 * | 2/2011 | Mansouri et al. | 210/650 |

\* cited by examiner

AIRCRAFT POTABLE WATER SYSTEM

RELATED APPLICATION

This application claims priority under 35 U.S.C. §119(e) to U.S. Provisional Patent Application No. 61/351,597 filed on Jun. 4, 2010. The entire disclosure of this provisional patent application is hereby incorporated by reference.

BACKGROUND

A potable water system can be installed in an aircraft to supply cabin outlet facilities (e.g., handwash basins in lavatories and sinks in onboard kitchens) with fresh water. A potable water system can comprise a water storage tank, a supply line and tap lines which connect the water supply tank to the outlet facilities. A purification device is located within the potable water system so as to optimize its purification purposes while also being compatible with installation, inspection and maintenance.

SUMMARY

A purification device is provided for a potable water system that does not require the use of precious aircraft power. The device includes a microorganism filter that effectively and efficiently removes microorganisms in the potable water supply line. The filter has a cartridge construction wherein membranes can be compiled so as to achieve low pressure drops, high flow rates, and/or long life cycles.

DRAWINGS

DESCRIPTION

Figure 1:
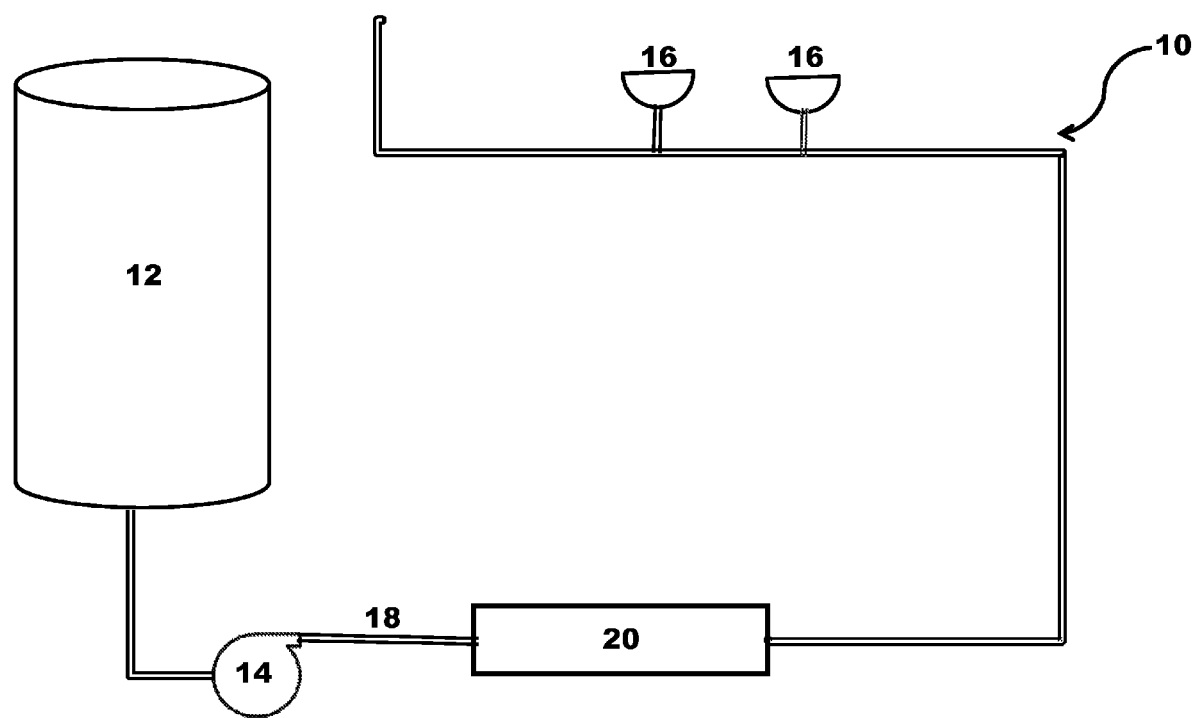
FIG. 1 is a schematic view of the potable water system.

Referring now to the drawings, and initially to FIG. 1, a potable water system 10 is schematically shown. The potable water system 10 can comprises a water tank 12, a pump 14, and outlet facilities 16. In the illustrated system 10, the pump 14 conveys water from the tank 12 through a supply line 18 (e.g., pipes, tubes or other hydraulic conduits) from which water can be tapped at the outlet facilities 16.

The potable water system 10 can also include other components such as, for example, another tank, another pump, a filtering device, tank-filling means, and/or flow-directing valves. Additionally or alternatively, a potable water system without a tank 12 and/or a pump 14 is possible with, and contemplated by, the present invention. For example, other sources of pressurization (e.g., bleed air) could be employed. If is further noted that the potable water system 10 could instead be a recirculating system wherein untapped water is returned to the storage tank.

The potable water system 10 can be designed specifically for use on a vehicle, and more specifically for use on aircraft. In an aircraft application, the outlet facilities 16 can comprise, for example, cabin facilities such as wash basins in lavatories and/or sinks in onboard kitchens.

The potable water system 10 further comprises a water-purification device 20. In the illustrated system 10, there is one device 20 positioned in the supply line 18 downstream of the tank 12. But the water-purification device 20 could be positioned elsewhere in the system and/or additional devices 20 could be provided in the supply line 18 or in any other suitable location in the system 10. The device location(s) within the system 10 will typically be selected to optimize its purification purposes while also being compatible with installation, inspection and maintenance. For example, a water-purification device 20 could additionally or alternatively be positioned upstream of the tank 12.

Figure 2:
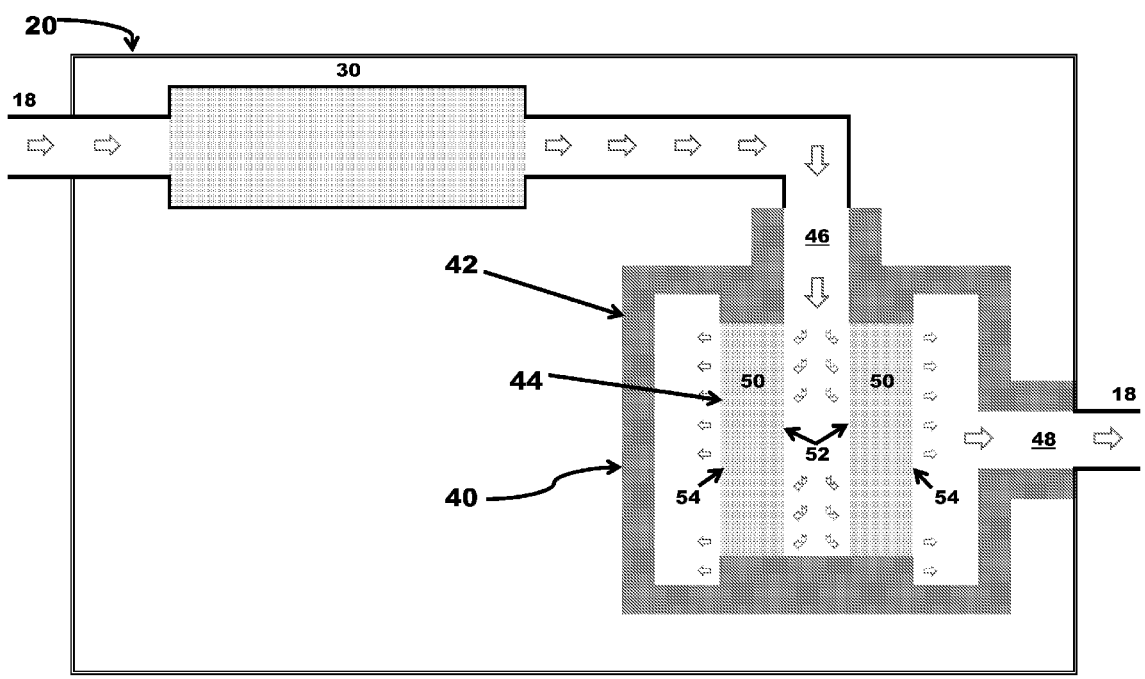
FIG. 2 is a schematic view of a water-purification device, wherein the microorganism filter has a radially outward flow direction.

As is best seen by referring to FIG. 2, the water-purification device 20 comprises a particle filter 30 and a microorganism filter 40. The particle-filter 30 is situated upstream of the microorganism filter 40. The filter 30 can comprise, for example, a black carbon block through which water passes on route to the microorganism filter 40. The particle filter 30 functions to remove particles and inorganic impurities from the water, but it will usually not retain and/or kill microorganisms.

The microorganism filter 40 comprises a housing 42 and a filter cartridge 44. The housing 42 will typically be a permanent part of the device 20 that is mounted or otherwise fixed relative to the potable water system 10. Although specific structure is not shown in the drawings, the housing 42 includes an inlet path 46 and an outlet path 48.

The filter cartridge 44 is usually periodically replaced and thus removably installable into the housing 42. The cartridge 44 comprises filtration media 50 and has an inlet side 52 (communicating with the inlet path 46) and an outlet side 54 (communicating with the outlet path 28). Water enters through the inlet path 46, travels to the cartridge's inlet side 52, flows through the filter media 50 to the cartridge's outlet side 54, and then exits through the outlet path 48.

Figure 3:
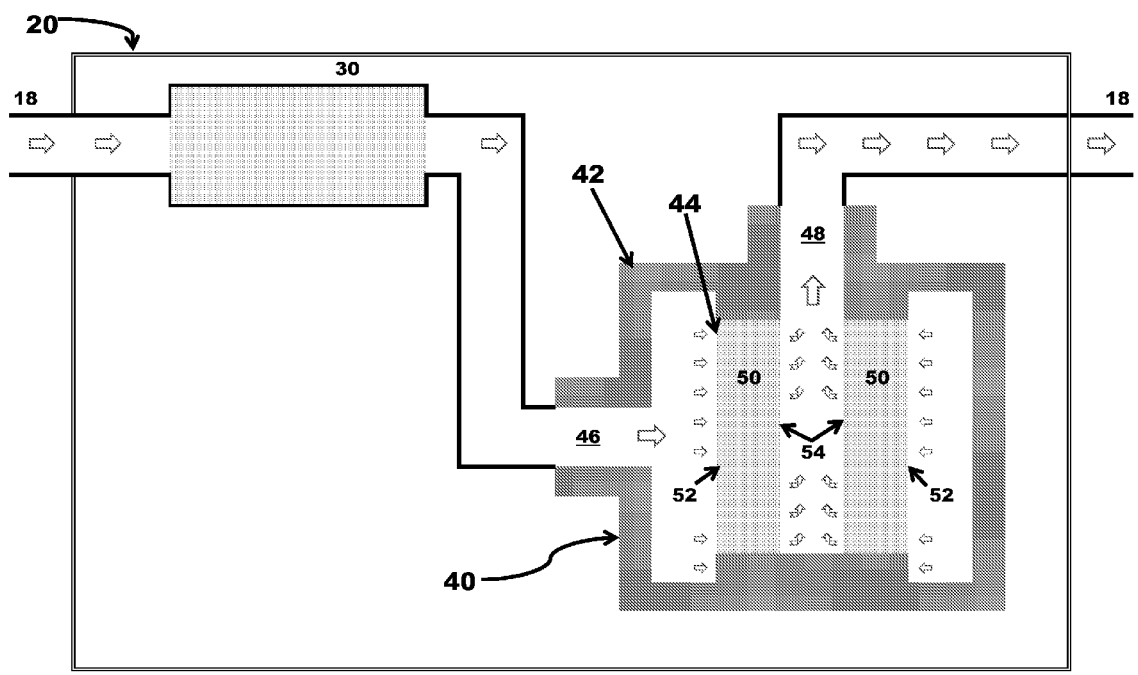
FIG. 3 is a schematic view of the water-purification device, wherein the microorganism filter has a radially inward flow direction.

In the filter 40 shown in FIG. 2, the media 50 assumes a ring-like shape. The cartridge's inlet side 52 defines the ring's inner diameter and the cartridge's outlet side 54 defines the ring's outer diameter. Thus, the flow direction in FIG. 2 is radially outward. In the filter 40 shown in FIG. 3, the media 50 also assumes a ring-like shape, but the cartridge's inlet set 52 defines the ring's outer diameter and the cartridge's outlet side 54 defines its inner diameter. Thus, the flow direction in FIG. 3 is radially inward.

The filter media 50 need not have a ring-like or circular geometry. It can have any construction or shape wherein fluid on the cartridge's inlet side 52 must flow through the filter media 50 to reach its outlet side 54. And although a pleated assemblage is featured in the close-up view (FIG. 4), non-pleated media is possible and contemplated.

The cartridge 44 can include other elements conventional to cartridge constructions. It can include, for example, end caps on either end of the filter media 50, a support tube situated in its core, and/or a protection screen encompassing its outer perimeter.

Figure 4:
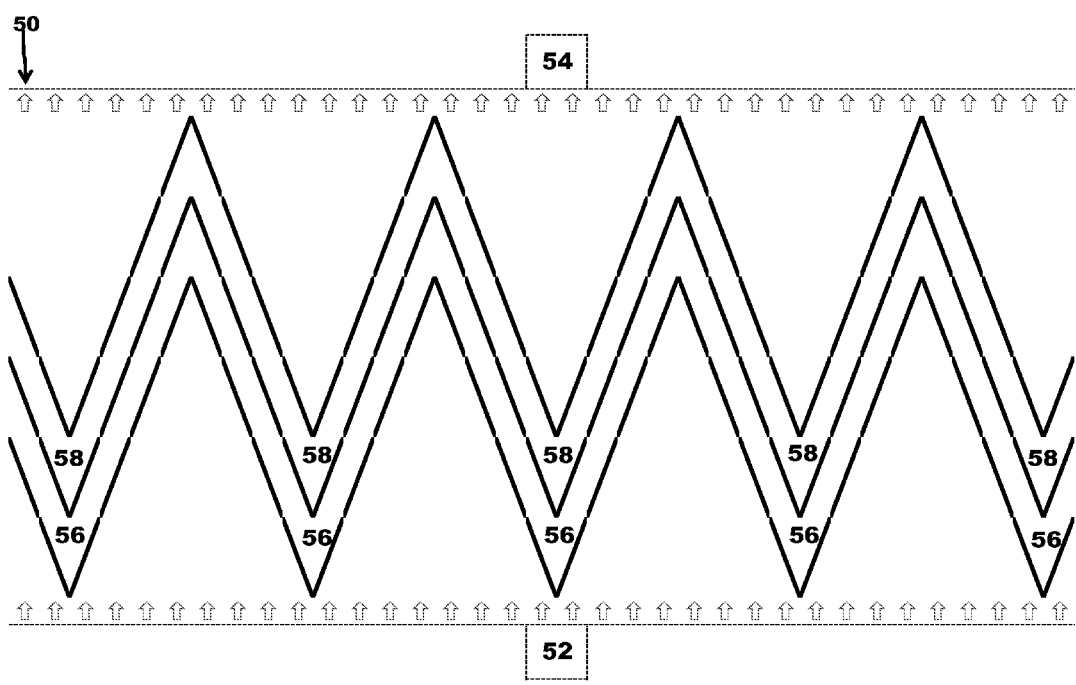
FIG. 4 is a close-up view of the filter media.

Referring now to FIG. 4, the filter media 50 can comprise a plurality of pleats arranged in a cylindrical shape. The illustrated media 50 corresponds to the radially-outward cartridge construction shown in FIG. 2, with the radially inner peaks of the pleats forming the inlet side 52 and the radially outer peaks of the pleats form the outlet side 54. With the radially-inward-flow design, the roles of the peaks would be reversed.

The media 50 comprises at least one layer of microorganism-killing membrane 56 and at least one layer of microorganism-capturing membrane 58. The microorganism-killing membrane 56 can comprise a biocidal material and the microorganism-capturing membrane 58 can comprise an electropositive material.

The microorganism-killing membrane 56 is integrated so as to adhere on the water inlet side of the microorganism-capturing membrane 58. This can be accomplished by casting, sewing, stitching and/or other suitable adhering techniques. The inlet side of the membrane 58 refers to its face closest to the inlet side 52 of the cartridge 44.

During operation of the potable water system 10, microorganisms are captured in the membrane 58. If the membrane 58 was unaccompanied by the membrane 56 in the cartridge 50, the captured organisms would go onto to live quite happy lives in this new home. They would easily multiply in this environment to populate the microorganism-capturing membrane 58. Such a thriving microorganism metropolis will quickly cause clogging of the membrane 58. And this clogging would lead to high pressure drops, reduced flow rates, and/or shortened cartridge lives.

In the filter media 50, however, the microorganism-killing membrane 56 is in intimate contact with the microorganisms captured on the membrane 58. Thus any captured microorganisms are quickly killed whereby their population is kept under control.

The microorganism-killing membrane 56 can be situated on the inlet side of the microorganism-capturing membrane 58. Thus, water must pass through the membrane 56 to reach the membrane 58. The microorganism-killing membrane 58 is not expected to capture or retain microorganisms (or anything else for that matter); it can have a relatively high percentage of open area (POA). The POA of the microorganism-killing membrane 56 can be, for example, significantly greater than the POA of the microorganism-capturing membrane 58 (e.g., twice as great, four times as great, ten times as great, etc.).

The microorganism-killing membrane 56 can comprise an antibacterial fabric containing biocidal nanosilver that is vacuum sputtered. The fabric can be rayon or polyester and it can be woven or non-woven. Such fabrics are available from, for example, Good Weaver Textile Co (Taiwan) and/or Scoutburg Inc (Taiwan).

The microorganism-killing membrane 56 can instead comprise an electro-spun polymer nanofiber mat containing biocidal nano-silver. The nanosilver particles can be embedded within the mat's nanofibers. Fuzzy nanosilver can be coated the mat's nanofibers and/or co-electro-sprayed with the matt. And/or the mat's nanofibers can be vacuum-sputtered with nanosilver.

The microorganism-killing membrane 56 can alternatively comprise an electro-spun polymer nanofiber mat containing organic biocides such as quaternary ammonium (commonly called "quats").

The microorganism-capturing membrane 58 can comprise microglass fiber with nano aluminum coated thereon. Or nano-alumina can be deposited on the microglass fiber either alone or co-deposited with carbon black powder. Nanocream™ and Nanocream PAC™, available from Argonide Corporation, are both suitable candidates. Both are highly effective in retaining bacteria, viruses, cysts. Nanocream PAC™ also retains soluble organics (VOCs, toxic organics) and residual chlorine with high efficiency.

If the microorganism-capturing membrane 58 contains active carbon powder, it can also absorb any minimal biocides should they happen to leak from the membrane 56.

Figure 5:
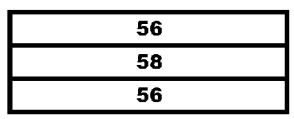
FIGS. 5-6 are each close-up views of modified forms of the filter media.
Figure 6:
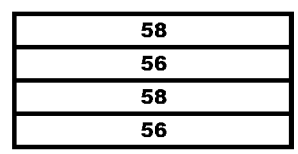

The filter media 50 can also include a microorganism-killing membrane 56 on the outtake side of the microorganism-capturing membrane 58, as shown in FIG. 5. And/or the filter media 50 can include multiple layers of membrane pairs 56/58 as is shown in FIG. 6.

Figure 7:
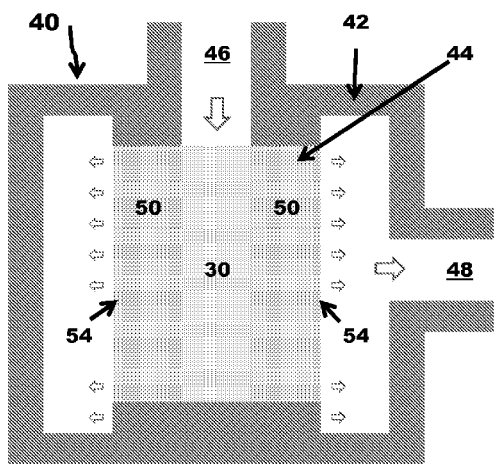
FIG. 7 is a schematic view of a radially-outward microorganism filter that incorporates a particle filter.
Figure 8:
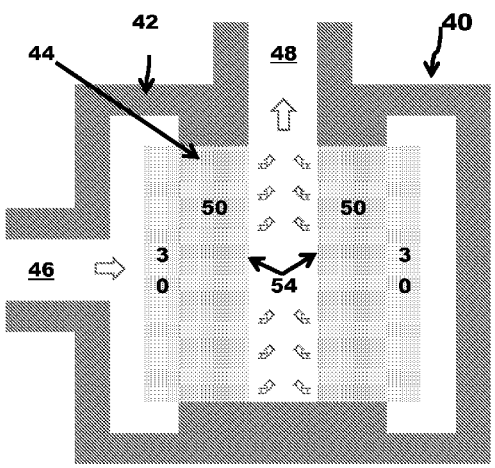
FIG. 8 is a schematic view of a radially-inward microorganism filter that incorporates a particle filter.

In the purification device 20 shown in FIGS. 3-4, the particle filter 30 had a construction separate from that of the microorganism filter 40. As shown in FIGS. 7-8, a particle filter 30 can additionally or alternatively be incorporated into the filter cartridge 42. The particle filter 30 (e.g., a black carbon block) can be incorporated into the bore of the cartridge 42 for radially outward flow constructions (FIG. 7). Or it can be incorporated into an outer annulus of the cartridge 42 for radially inward flow constructions (FIG. 8).

Although the potable water system 10, the purification-device 20, the microorganism filter 40, the cartridge 44, the filter media 50, the microorganism-killing membrane 56 and/or the microorganism-capturing membrane 58 have been shown and described with respect to a certain embodiment or embodiments, it is obvious that equivalent alterations and modifications will occur to others skilled in the art upon the reading and understanding of this specification and the annexed drawings.

REFERENCE NUMBERS

10 potable water system
12 water storage tank
14 pump
16 outlet facilities
18 supply line
20 water purification device
30 particle filter
40 microorganism filter
42 housing
44 filter cartridge
46 inlet path
48 outlet path
50 filtration media
52 inlet side
54 outlet side
56 microorganism-killing membrane
58 microorganism-capturing membrane

The invention claimed is:

1. A filter media comprising
   a microorganism-killing membrane that kills microorganisms and a microorganism-capturing membrane that captures microorganisms wherein the two membranes are bonded to each other to be a free standing sheet; and wherein the membranes are pleated to increase a flow rate through the filter media; and
   wherein the microorganism-capturing membrane comprises microglass fiber on which nano alumina is coated or deposited.

2. The filter media as set forth in claim 1, wherein the microorganism-killing membrane is bonded to an inlet side of the microorganism-capturing membrane.

3. The filter media as set forth in claim 1, wherein the microorganism-killing membrane comprises a biocidal material and wherein the nano alumina comprises an electropositive material.

4. The filter media as set forth in claim 1, wherein a percentage of open area (POA) of the microorganism-killing membrane is at least twice as great as the POA of the microorganism-capturing membrane.

5. The filter media as set forth in claim 1, wherein a POA of the microorganism-killing membrane is at least four times as great as the POA of the microorganism-capturing membrane.

6. The filter media as set forth in claim 1, wherein the microorganism-killing membrane comprises an antibacterial fabric and contains biocidal nano silver.

7. The filter media as set forth in claim 1, wherein the microorganism-killing membrane comprises an electro-spinning polymer nanofiber mat containing biocidal nano-silver.

8. The filter media as set forth in claim 7, wherein nano-silver particles are embedded within the mat's nanofibers or wherein fuzzy nanosilver is coated on the mat's nanofibers.

9. The filter media as set forth in claim 1, wherein the microorganism-killing membrane comprises an electro-spun polymer nanofiber mat containing organic biocides.

10. The filter media as set forth in claim 1, wherein the microorganism-killing membrane is adhered to an inlet side of the microorganism-capturing membrane,
wherein the microorganism-killing membrane comprises a biocidal material and wherein the nano alumina comprises an electropositive material, and
wherein a POA of the microorganism-killing membrane is at least twice as great as the POA of the microorganism-capturing membrane.

11. A filter cartridge comprising the filter media set forth in claim 1, wherein water passes through the filter media as it flows from an inlet side to an outlet side.

12. A microorganism filter comprising a housing and a filter cartridge as set forth in claim 11, wherein the filter cartridge is mounted within the housing.

13. A method of using the microorganism filter set forth in claim 12, said method comprising the step of periodically replacing the filter cartridge.

14. A water-purification device comprising the microorganism filter set forth in claim 12, and a separate particle filter situated upstream of the microorganism filter.

15. The water-purification device as set forth in claim 14, wherein the microglass fiber further comprises carbon black powder co-deposited with the nano alumina.

16. A potable water system comprising a supply line and the water-purification device set forth in claim 14 installed in the supply line.

17. The microorganism filter as set forth in claim 12, wherein the microglass fiber further comprises carbon black powder co-deposited with the nano alumina.

18. The filter cartridge as set forth in claim 11, wherein the microglass fiber further comprises carbon black powder co-deposited with the nano alumina.

19. The filter media as set forth in claim 1, wherein each of the membranes includes cylindrical pleats; and wherein a pleat of the microorganism-killing membrane include radially inner peaks forming an inlet side of the filter media and a pleat of the microorganism-capturing membrane include radially outer peaks forming an outlet side of the filter media.

20. The filter media as set forth in claim 1, wherein the microglass fiber further comprises carbon black powder co-deposited with the nano alumina.

\* \* \* \* \*